INVENTOR.
H. L. WALKER

INVENTOR.
H. L. WALKER

United States Patent Office 2,816,858
Patented Dec. 17, 1957

2,816,858
METHOD OF CONTROLLING FRACTIONATING COLUMN REFLUX

Harry L. Walker, Bartlesville, Okla., assignor to Phillips Petroleum Company, a corporation of Delaware Application September 25, 1953, Serial No. 382,322

2 Claims. (Cl. 202—40)

This invention relates to the control of the operation of a fractional distillation column. In one aspect it relates to a method for the control of reflux to a fractionating column. In another aspect it relates to apparatus and a method for controlling the addition of reflux to a fractionating column so as to maintain a maximum on any predetermined reflux ratio conducive to good fractionator operation without flooding and irrespective to changes in feed rate, overhead product withdrawal rate and changes in reflux temperature.

An object of my invention is to devise a method for automatically controlling the addition of reflux to a fractionating column.

Another object of my invention is to devise a method for controlling the rate of introduction of external reflux to a fractionating column in such a manner that the vapor load on the column is maintained at a maximum (without flooding) regardless of changes in the feed rate, and/or the overhead product rate, and/or the reflux temperature.

Still another object of my invention is to devise a method for controlling the introduction of external reflux to a fractionating column wherein the rate of addition of reflux is maintained at a maximum without danger of flooding the column.

Yet another object of my invention is to achieve the above given objects wherein automatically operating apparatus and equipment are used, and requiring only a minimum of operating manpower.

Yet other objects and advantages of my invention will be realized upon reading the following disclosure which taken with the attached drawing respectively describes and illustrates my invention.

I accomplish these objects and advantages by using a differential pressure controller set to operate on a differential pressure which is just below that encountered in flood condition of the column. When a differential pressure greater than the set pressure differential is impressed upon the pressure differential controller instrument air pressure to a reset rate of flow controller is increased thereby causing this reset controller to operate in such a manner as to increase air pressure to a throttle type diaphragm motor valve thereby decreasing the rate of flow of reflux to the column, under which condition the pressure differential between the two points is decreased. In one embodiment of my invention the differential pressure controller directly operates a throttle valve in the reflux line. By use of the reset controller, I am able to obtain a finer control on the introduction of the reflux to the column than when the reset rate of flow controller is not used.

In another embodiment of my invention I use a pressure transmitter which operates in response to pressure direct from one point of a fractionating column to control air pressure to one side of a diaphragm in the differential pressure controller. A second pressure transmitter is used to control air pressure to the other side of the diaphragm in the differential pressure controller in response to direct pressure from another point in the fractionating column. In this latter embodiment, for example, if a fractionating column is operating under several hundred pounds pressure, it is not necessary to transmit this high pressure directly to the diaphragm of the differential pressure controller since this controller easily operates on considerably lower pressures. Also by use of the pressure transmitters materials in process are not transmitted through tubes or small pipes any great distance since these transmitters may be installed on the outer wall of the column. The differential pressure controller may then be installed at some convenient point, as for example, on an operating panel in a control room. In this embodiment the differential pressure controller may control air pressure directly to a throttle type diaphragm motor valve to control the rate of flow of reflux to the column.

In still another embodiment of my invention I use the two pressure transmitters adjacent pressure points on the column and transmit air from these transmitters to a differential pressure controller, for example, in a control room, with the differential pressure controller controlling air to a reset controller instrument which in turn controls operating air to a throttle type diaphragm motor valve in the reflux line.

Among the advantages of my invention I can enumerate the following: By using a differential pressure controller I can maintain maximum permissible reflux ratios, I can maintain maximum liquid-vapor loads in the column, and I can maintain any desired liquid-vapor load in a column less than the maximum, irrespective of changes in the feed rate, in the overhead product rate and in the reflux temperature. I also introduce reflux at a maximum rate without danger of flooding the column. I control the introduction of reflux to the column in response to pressure differentials between a pair of pressure points while making changes in the column heat input rate, column pressure, feed rate, feed composition, feed temperature and reflux temperature.

Figure 1:
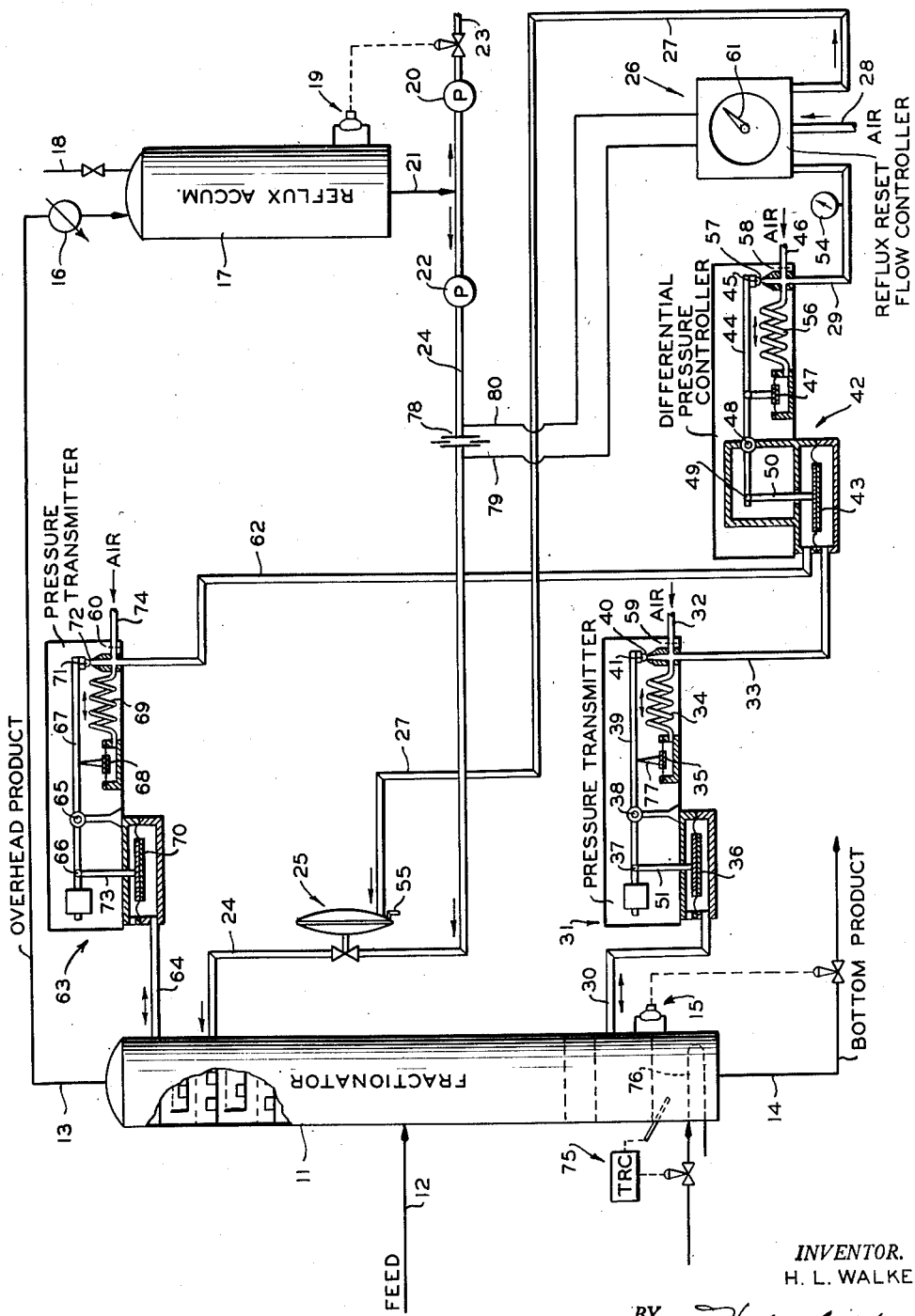
Figure 1 is a diagrammatic representation of one embodiment of my invention.

Referring now to the drawing and specifically to Figure 1, reference numeral 11 identifies a fractionating column which is provided with bubble captray assemblies, packing or any desired type of vapor-liquid contacting apparatus. This column is shown equipped with a feed line 12, an overhead product line 13, a bottom product withdrawal line 14 and a reflux line 24. A reboiler coil 76 is provided in the bottom of the column and reboiling heat to this coil is controlled by a temperature recorder controller apparatus 75 in response to the temperature of the liquid in the bottom of the column. The overhead product line 13 leads to a reflux condenser 16 from which condensate passes into a reflux accumulator 17. A valved line 18 is provided for pressure relief or withdrawal of uncondensed material as desired. Condensate is withdrawn from accumulator 17 through a pipe 21, and that portion of the condensate needed for refluxing the fractionating column 11 is passed through line 24 under the influence of a pump 22 and that portion of the condensate not needed for refluxing is passed under the influence of a pump 20 through line 23 to product storage or such other disposal as desired. A flow controller motor valve assembly 19 is provided for controlling passage of condensate through pipe 23 in response to the liquid level of condensate in the accumulator 17.

A liquid level controller valve assembly 15 is employed as illustrated for control of the removal of the bottom product from the fractionator in response to the liquid level of that product in the column.

Two pressure transmitting tubes or conduits, 30 and 64, are attached to points of the column as illustrated. However, these two tubes may be attached at any two points of the column provided there is a pressure drop in the column between the two points. The tubes may be attached above and below one bubble cap tray but it is preferable to attach the tubes at points between which the pressure drop in the column will be greater than that across only one tray. For exemplary purposes in Figure 1, I attach tube 64 to the column above the top tray and tube 30 to the column at a point below the bottom tray and above the level of kettle liquid. In other words tube 30 is attached to the column to communicate with the vapor space below the bottom tray.

Tube 30 leads from this vapor space below the bottom tray to the lower side of a diaphragm 36 of a pressure transmitter assembly 31. The space adjacent the top side of this diaphragm is vented to the atmosphere. To this diaphragm is connected a push rod 51 which is pivoted at 37 to a beam 39. This beam 39 is pivoted at fulcrum 38. At the end of the beam 39 opposite the pivot point 37 is a throttle tip 41 which cooperates with a bleed orifice 40 to control the rate of air flow from this orifice. A diaphragm 35 is provided as illustrated. This diaphragm is connected to the beam 39 by a rod 77. A tube 32 conducts air under pressure from a source, not shown, to the pressure transmitter assembly 31. The tube 32 at a point fairly close to its connection to a tube 33 contains an orifice 59 to restrict the flow of air from tube 32. A tube 34 connects the space below the diaphragm 35 with the tube 33 as illustrated. This tube 33 conducts air under pressure from the pressure transmitter assembly 31 to the underside of a diaphragm 43 in a differential pressure controller assembly 42.

The tube 64 which is connected above the top tray to the column leads therefrom to the underside of a diaphragm 70 in a second pressure transmitter assembly 63. The space adjacent the upper side of this diaphragm 70 is also vented to the atmosphere. This diaphragm 70 is connected by a push rod 73 to a beam 67 by a pivot 66. Beam 67 is pivoted at a fulcrum 65. At the end of the beam 67 opposite the pivot 66 is a throttle tip 71 which cooperates with an orifice 72 to control the rate of air bleed therethrough. A tube 74 conducts air under pressure from a source, not shown, to this pressure transmitter assembly 63. This tube 74 is provided with an orifice 60 at a point adjacent a transmitter 63 for restricting air flow from this tube into a tube 62 which leads to a space adjacent the top side of the diaphragm 43 of the differential pressure controller assembly 42. A tube 69 connects the tube 62 with a space adjacent the underside of a diaphragm 68 in the pressure transmitter assembly 63. This diaphragm 68 is attached as shown to the beam 67.

The differential pressure controller assembly 42 is constructed more or less similar to the pressure transmitters 31 and 63. There are some differences, however. The diaphragm 43 of this differential pressure controller assembly is attached to a push rod 50 which in turn is pivoted to a beam 44 by a pivot 49. The beam 44 rotates around a fulcrum point 48. At the end of the beam 44 opposite the pivot point 49 is a throttle tip 45 which cooperates with a bleed orifice 57 to regulate the flow of air therethrough. A tube 46 conducts air under pressure from a source, not shown, to this differential pressure controller assembly. The tube 46 is connected with a tube 29 as shown. In tube 46 is provided an orifice 58 for restricting the flow of air from tube 46 into tube 29. A tube 56 connects tube 29 with a space below a diaphragm 47 as shown. This diaphragm 47 is connected with the beam 44 as shown. The tube 29 conducts air under pressure from the differential pressure controller 42 to a reset flow controller 26 provided for controlling operation of a reflux flow control valve. Instrument air from a source, not shown, is conducted through a pipe 28 to this reset flow controller. This reset flow controller apparatus 26 is standard equipment obtainable from process control instrument supply houses. Such reset flow controls, their construction and operation, are well understood by those skilled in the art.

A reset pointer 61 is shown in the reset control instrument 26. Since this reset element, according to my invention, is reset automatically and continuously, the controller apparatus 26 operates continuously in response to air under pressure from tube 29 to control the flow of air under pressure through tube 27 to the diaphragm of the diaphragm operated motor valve 25 to close the valve in the reflux line 24. Since air pressure is always bled from the air inlet tube 28 into the tube 27 an air bleed 55 is provided in the housing of the diaphragm of the motor valve 25, as shown. This bleed orifice 55, of course, is relatively small and permits bleeding of the air from the diaphragm housing to the atmosphere at such times when it is desired not to close the motor valve 25. A vent is provided in the opposite side of the diaphragm housing for pressure equalization in case of, for example, a leakage through the diaphragm. This diaphragm motor valve 25 is a spring loaded, normally open motor valve. However this valve can, if desired, be a normally closed spring loaded motor valve requiring increased air pressure from tube 27 to open the valve. In this latter case, when air pressure in tube 29 increases, the air leaving instrument 26 in tube 27 decreases, thereby allowing the normally closed valve to be throttled by its spring to a partially closed position to decrease the flow of reflux to the fractionator. The tube 29 is provided with a pressure gage 54 for visual observation of pressure, if desired.

In the operation of the apparatus of Figure 1 of my invention a feed stock to be fractionated is introduced into the fractionating column 11 through the feed line 12 at a temperature normally maintained on the feed tray. Reboiling heat is added to the column usually in the form of steam through the reboiler coil 76. The rate of steam introduction into the reboiler is controlled by the temperature controller apparatus 75. If desired this temperature controller apparatus can be a recording apparatus when it will then be called a temperature recorder controller. Bottoms product material is removed from the bottom of the column by the conventional float controlled motor valve apparatus 15 in response to the liquid level of the product in the kettle. Overhead product is removed from the column through the overhead line 13, the product being condensed in condenser 16. Condensate passes on through the reflux accumulator 17 from which the liquid is removed by way of line 21 and the portion required for refluxing is passed through line 24 into the top of the column while that portion not needed for refluxing is removed by way of line 23 for subsequent use, storage, etc., as desired. The float controlled motor valve assembly 19 regulates the amount of condensate removed from the system through line 23 in response to the level of liquid in the accumulator.

In the operation of such a fractionating column there is always a difference in pressure between the bottom and the top of the column. There is always a difference in pressure across each tray of the column and obviously the total drop in pressure across the entire column will be the sum of the pressure drops across all of the trays. The pressure drop across a column is a function of a number of variables, such as feed rate, overhead product rate, vapor load on the column, reflux temperature, number of trays and other variables of more or less importance. For a given feed rate, a given overhead product rate and a given reflux temperature, the pressure drop across the column is relatively constant. If, for example, the feed rate to the column is increased, the pressure drop through the column increases. Also if the reflux temperature decreases, condensation in the upper portion of the column is increased thereby increasing the liquid load in the column, which operation results in an increased pressure drop through the column. It is well understood in the fractionation art that a better overhead product is obtained when using a maximum reflux ratio, the reflux ratio being defined as the ratio of the number of mols of overhead condensate used as reflux to the number of mols of overhead condensate withdrawn as product. However when using a maximum reflux ratio any increase in the reflux ratio upsets the column operation, or a drop in reflux temperature upsets the column operation in such a manner as to cause flooding of the column, that is, carrying overhead of liquid from the top tray by entrainment with the overhead product vapor. Such operation of course contaminates the overhead product.

According to my invention I operate a fractionating column at a maximum reflux ratio in order to make the best possible quality overhead product and the control apparatus which I use controls the rate of introduction of reflux to offset conditions which would normally cause flooding of the column. In other words, when the feed rate to the column is increased, for any reason whatever, and the pressure drop across the column increases in response thereto my apparatus functions to decrease the rate of introduction of reflux. Likewise, if atmospheric conditions change abruptly to lower the reflux temperature, increased condensation is caused in the top of the column thereby increasing the pressure drop across the column and my apparatus operates to throttle the flow of reflux into the column. When any condition occurs to produce an excessive vapor load through the column or excessive liquid load in the column, pressure drop across the column increases and my apparatus operates to throttle the flow of reflux to the column thereby establishing normal operations.

The control apparatus illustrated in Figure 1 operates in the following manner: The tube 30 is attached to the column 11 just below the bottom tray and conducts pressure from this space to the underside of the diaphragm 36 in the pressure transmitter assembly 31. Air pressure from a source, not shown, enters this assembly 31 by way of line 32. Line 32 contains an orifice 59 which restricts air flow into tube 33. When pressure on the underside of diaphragm 36 increases the diaphragm rises and push pin 51 raises the left hand end of beam 39. The right hand end of beam 39 is then lowered to such an extent that the throttle tip 41 restricts the flow of air through the bleed orifice 40. When air flow is restricted through bleed orifice 40 air pressure in tube 33 increases. This increased air pressure in tube 33 is transmitted to tube 34 to the underside of the diaphragm 35 which operates by way of rod 77 to resist the downward movement of the throttle tip 41. This increase in air pressure of tube 33 is also transmitted to the underside of the diaphragm 43 in the differential pressure controller assembly 42.

At the top of the column the operation of the pressure transmitter assembly 63 is similar to that just described relative to the pressure transmitter assembly 31 and pressure at the top of the column is transmitted through tube 64 to the underside of the diaphragm 70. Pressure at that surface tends to raise the left hand end of beam 67 and to lower the throttle tip 71 and restrict air flow through bleed orifice 72. Under this condition air pressure coming from tube 74 through orifice 60 increases in tube 62. This increase of pressure is registered under diaphragm 68 which tends to raise the throttle tip 71 and establish equilibrium of the beam 67. The increased pressure in tube 62 is transmitted to the upper side of the diaphragm 43 of apparatus assembly 42. Thus, the pressure on the underside of diaphragm 43 is proportional to the pressure in the bottom of the column while the pressure on top of this diaphragm is proportional to the pressure in the top of the column. Since the bottom column pressure is always greater than the top column pressure a pressure differential will always be exerted across diaphragm 43 with the underside of the diaphragm being exposed to a higher pressure than the top side. Thus when the pressure differential across the column increases the pressure differential across diaphragm 43 also increases with the tendency to raise the left hand end of beam 44 and to lower the throttle tip 45 to restrict air flow through the bleed orifice 57. Air enters this bleed orifice from line 46 passing through the restricting orifice 58. When the throttle tip 45 is moved closer to bleed orifice 57 and throttles the flow of air therethrough air pressure in tube 29 increases. This increase of air pressure in tube 29 is transmitted to the reset flow controller 26 which continuously resets this flow controller apparatus to continuously operate the diaphragm operated motor valve 25 to control the flow of reflux to the column. As illustrated in the drawing when the pressure differential from bottom to top of the column increases diaphragm 36 rises thereby causing air pressure in tube 33 to increase more than the corresponding increase of air pressure in tube 62, resulting from a possible increase in pressure in the top of the column. These two pressures then are exerted against the sides of diaphragm 43 with the result that this diaphragm is raised which movement lowers the throttle tip 45 to further restrict air bleeding from orifice 57. This operation results in an increase of air pressure in tube 29 which in turn operates the reset element of the reset controller 26 to increase the air pressure in tube 27 thereby tending to throttle or partially close the diaphragm operated valve 25 which final operation restricts the flow of reflux to the column thereby reducing the liquid load on the column to reestablish the desired pressure differential across the column.

When the opposite condition occurs, that is, when the pressure differential across the column decreases to a value below the maximum permissible, the diaphragms 36 and 70 operate to permit greater bleeding of air from orifices 40 and 72 respectively, thereby transmitting lower pressures to the sides of diaphragm 43 with the result that the differential across this latter diaphragm is decreased. The decreased differential across diaphragm 43 raises throttle tip 45 which causes decrease of air pressure in tube 29. This latter decrease of pressure causes a resetting of the reset element of apparatus 26 and a decrease of air pressure in tube 27 thereby permitting the spring loaded throttle valve apparatus 25 to open somewhat to permit a greater flow of reflux to the column. The greater flow of reflux to the column tends to increase the load on the column thereby increasing the pressure differential from bottom to top to a desired predetermined differential. The orifice 78 and connecting tubes 79 and 80 in cooperation with the reset controller 26 merely permits indication or recording of the rate of flow of reflux through tube 24. The pressure gage 54 which registers pressure in tube 29 is provided merely for convenience of an operator. However this gage can be calibrated in terms of pressure differential across the column as well as pressure, or both, so that the pressure differential across the column can be observed at any time.

Figure 2:
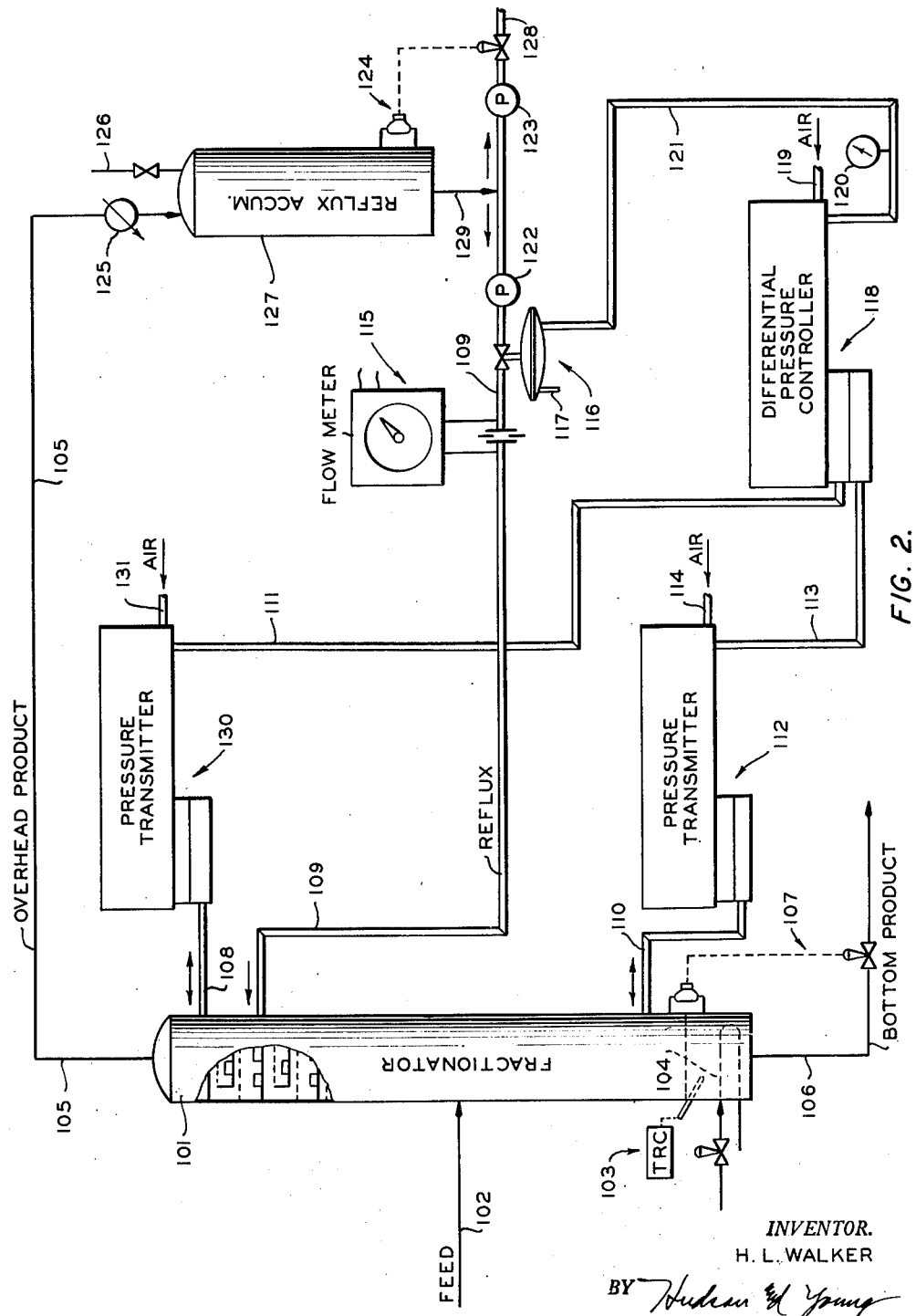
Figure 2 is a diagrammatic representation of another embodiment of my invention.

In Figure 2 of the apparatus, a column 101 is a conventional fractionating column similar to column 11 of Figure 1. Feed to be distilled enters the column by way of a line 102. Reboiling heat is added to the column through a reboiler coil 104. The flow of the reboiling heating medium through coil 104 is controlled by the temperature controller 103. Bottom product is removed by way of a line 106, control being effected by a float operated motor valve apparatus 107. Overhead product is removed by way of a line 105, condensed in condenser 125 and condensate is passed on to an accumulator 127. A valved line 126 is provided for pressure relief, if necessary. Liquid accumulating in tank 127 is withdrawn through a line 129 and that part required for refluxing is passed through a line 109 under the influence of a pump 122 while that portion not needed for refluxing is passed through a line 128 under the influence of a pump 123, the latter flow being controlled by a float controlled motor valve apparatus 124 in response to the level of liquid condensate in the accumulator. A flow meter apparatus 115 is provided in the reflux line 109 to indicate and/or record the rate of reflux flow therein.

A diaphragm operated motor valve assembly 116 is provided in line 109 to regulate the rate of flow of reflux liquid to the column. A bleed tube 117 is provided for continuously bleeding air pressure from the underside of diaphragm in the valve assembly 116. A vent is provided in the opposite side of the diaphragm housing to prevent possible build up of air pressure therein in case of diaphragm leakage.

Pressure from the bottom of the column is transmitted through a tube 110 to a pressure transmitter apparatus 112 which is similar to the pressure transmitter 31 of Figure 1. Air enters this transmitter 112 from a source, not shown, by way of a line 114 and by operation of a diaphragm in transmitter 112 air pressure in a line 113 is regulated. The air pressure from line 113 is transmitted to the underside of a diaphragm in a differential pressure controller 118 which is similar to the pressure differential controller 42 of Figure 1.

A tube 108 is connected at the top of the column and transmits pressure therefrom to the underside of a diaphragm in a pressure transmitter 130, which is similar to the transmitter 63 of Figure 1. Air, from a source, not shown, enters the transmitter 130 by way of a tube 131. Air from this tube 131 is regulated in pressure and is transmitted on through a tube 111 to the upper side of a diaphragm in the differential pressure controller 118 similar to diaphragm 43 in controller 42 of Figure 1. Since the pressure in the bottom of the column 101 is greater than the pressure in the top of the column the air pressure in the tubes 111 and 113 are different and accordingly a differential will be registered across the diaphragm in the differential controller 118. Air from the source, not shown, is conducted to this latter apparatus by way of the line 119. The pressure differential on the diaphragm controller 118 operates to control the pressure of air passing through a line 121 to the underside of diaphragm in the diaphragm operated valve assembly 116. This valve assembly is set up and operated in the same manner as the corresponding valve assembly of Figure 1, that is, when the pressure differential across the column increases the pressure differential in tube 113 relative to that in tube 111 increases and in response thereto air pressure in tube 121 increases thereby partially closing or throttling the valve of assembly 116. This valve assembly is a spring loaded, normally open, diaphragm motor valve requiring increase of pressure to throttle or close the valve while a decrease in pressure allows the compression spring to operate and open the valve. A pressure gage 120 is provided in tube 121 for observation of pressure therein since pressures registered by this gage will be proportional to pressure differential across the tower.

The difference between the embodiment of Figure 2 and the embodiment of Figure 1 is that in Figure 2 the reflux reset flow controller is eliminated. While such an operation, as represented by the apparatus of Figure 2, is in general satisfactory a finer control of the rate of flow of reflux can be accomplished when the reset reflux controller 26 of Figure 1 is used.

Figure 3:
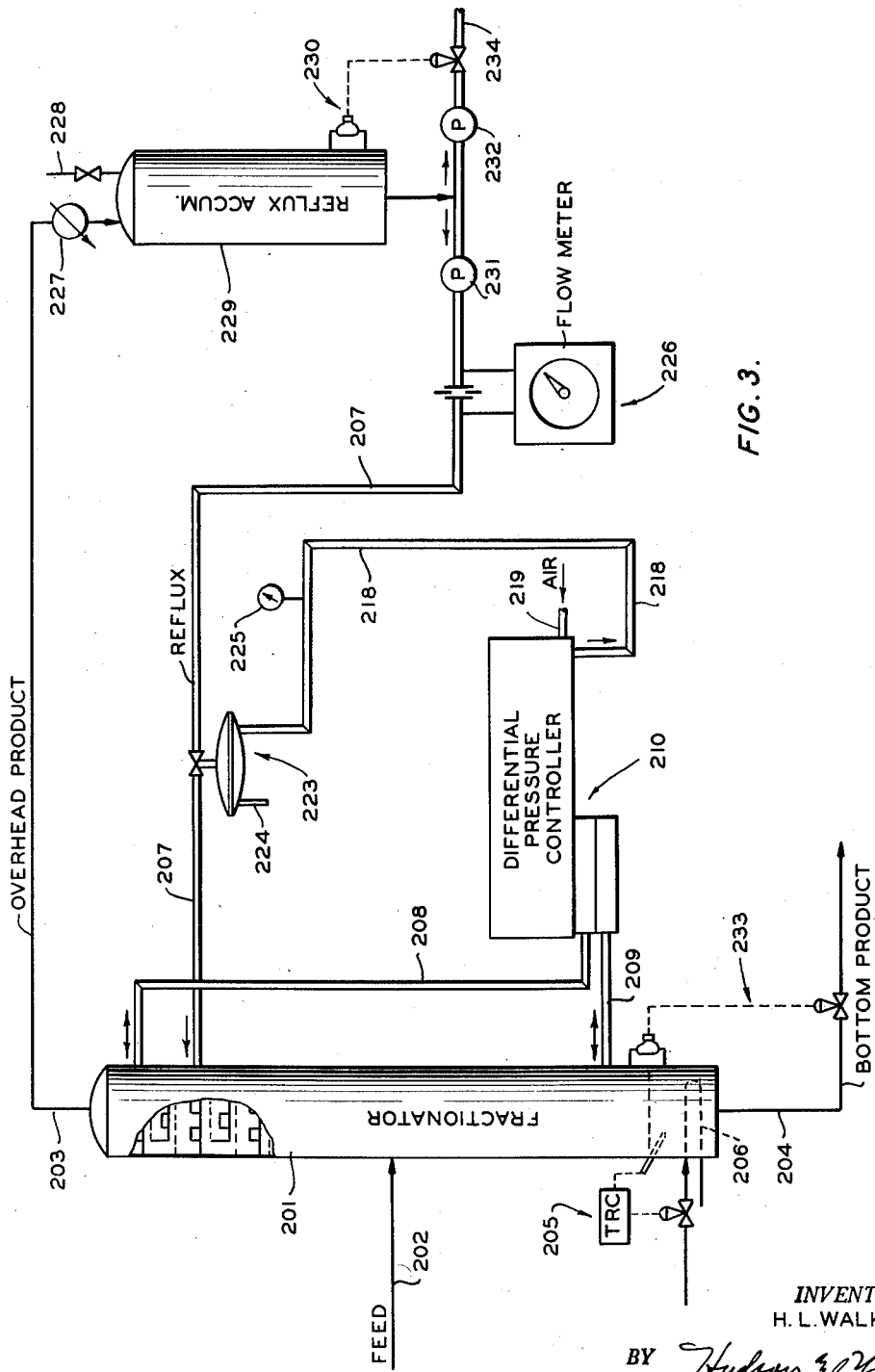
Figure 3 is a diagrammatic representation of still another embodiment of my invention.

In Figure 3 of the drawing a fractionator 201 is provided with a feed line 202, a reboiler coil 206, a temperature controller apparatus 205 for controlling reboiling heat, a bottom product withdrawal line 204 and an overhead vapor product line 203. The bottoms product removal through line 204 is controlled by a float controlled motor valve assembly 233 in response to the level of the liquid in column 201. The overhead vaporous product from line 203 is condensed in a condenser 227 the condensate accumulating in a reflux accumulator 229. A valved line 228 is provided for pressure relief or vapor removal, as required. A portion of the condensate is withdrawn from the bottom of the accumulator and is passed through a line 207 under the influence of a pump 231 for introduction into the top of the column. That portion of condensate not required for refluxing is removed from the system through a line 234 under the influence of a pump 232, flow therethrough being controlled by a float controlled motor valve apparatus 230 in response to the level of the condensate in the accumulator. A flow meter 226 is provided in line 207 for indication and/or recording the rate of flow of reflux therein.

A line 208 is connected with the top of the column for transmission of top tower pressure to the upper side of a diaphragm in a differential pressure controller 210 similar to control 42 of Figure 1. Tube 209 is attached to the lower portion of the column and conducts tower pressure from the vapor space just below the bottom tray to the underside of said diaphragm in controller 210. Air, from a source not shown, enters controller 210 by way of an air inlet tube 219. This controller operates to regulate the air pressure from tube 219 entering a tube 218. This tube 218 leads directly to the underside of a diaphragm operated spring loaded throttle valve 223. A bleed tube 224 is attached to the diaphragm housing for continuously bleeding air pressure therefrom. A vent is also provided in the diaphragm housing for equalization of pressure in case of leakage of air through the diaphragm. A pressure gage 225 is provided in line 218 for indicating and/or recording of pressure therein.

The differential pressure controller 210 of the embodiment of Figure 3 works in substantially the same manner as the differential pressure controller 42 of Figure 1. Thus, when a pressure differential is impressed across the diaphragm in the controller 210 air pressure from tube 219 is controlled on entering tube 218 and when the pressure differential across the column increases air pressure in tube 218 is increased thereby partially closing or throttling the valve 223 to restrict the flow of reflux to the column. In like manner if the pressure differential across the column decreases to a value below that desired to be maintained the control apparatus 210 operates to decrease the air pressure in tube 218 thereby permitting the compression spring on the spring loaded valve assembly to open or to open more if partially open, to permit the flow of more reflux to the column, thereby increasing the pressure differential across the column. The flow meter apparatus 226 is provided in line 207 merely for indication and/or recording of the rate of flow of reflux to the column.

While this apparatus is considerably more simple and requires less equipment than that illustrated in Figures 1 or 2 its operation is satisfactory in many installations, but in cases in which fine control is required the apparatus of Figure 1 is preferred.

Figure 4:
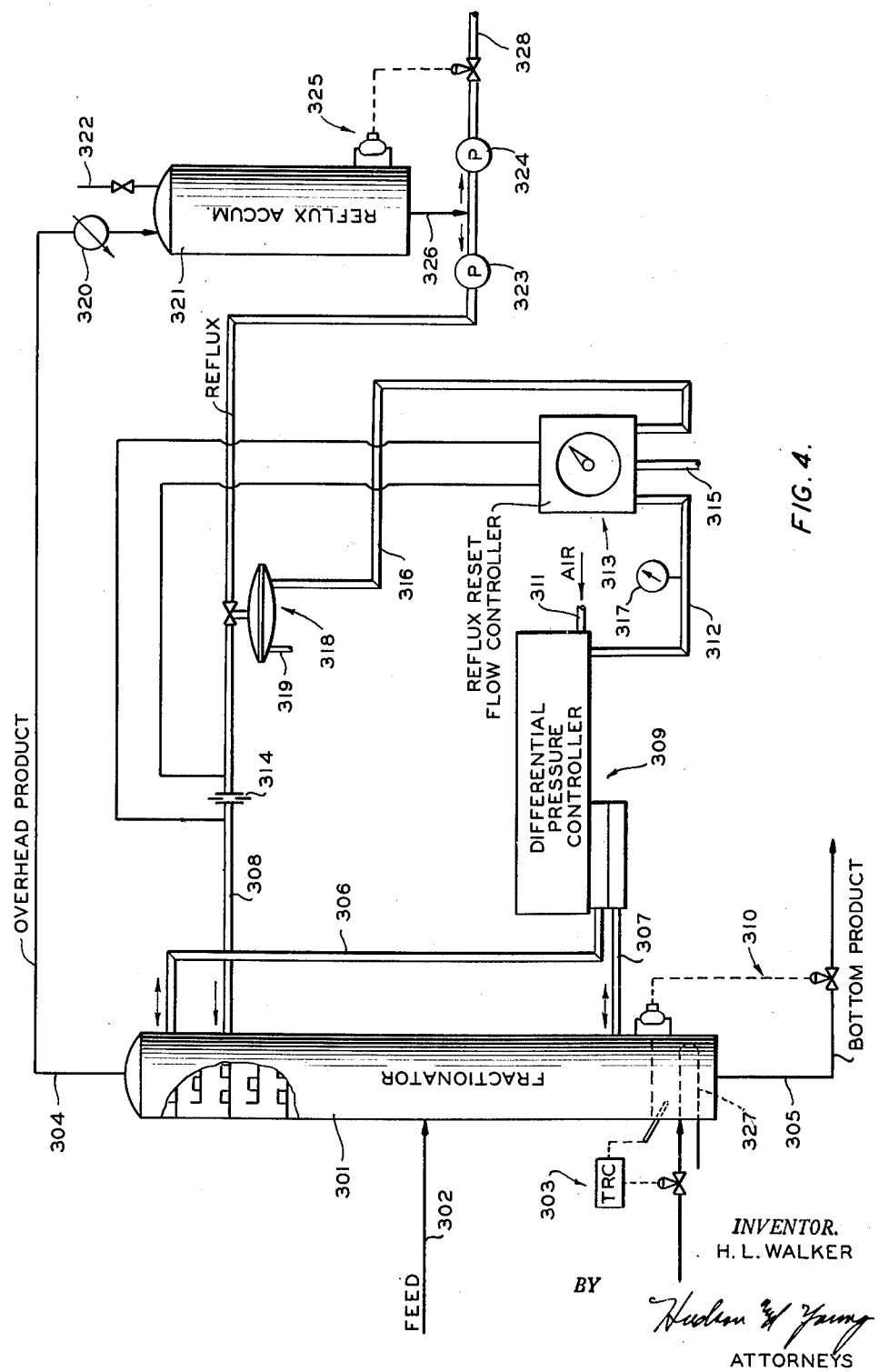
Figure 4 is a diagrammatic representation in still another embodiment of my invention.

In Figure 4, a fractionator column 301 is provided with a feed inlet line 302 an overhead vapor product line 304, a bottom product withdrawal line 305 and a reflux inlet line 308. A reboiler coil 327 is provided with a temperature recorder controller apparatus 303 operating in response to temperature of the kettle liquid in the column to control the flow of reboiling heating medium. A float controlled motor valve assembly 310 operates to control the rate of bottom product removal in response to the liquid level in the kettle. The overhead vapor from line 304 is condensed in a condenser 320 and condensate passing on to an accumulator 321. This accumulator is provided with a valve line 322 for pressure relief or vapor removal as desired. Condensate from this accumulator is removed through a line 326 and that portion required for refluxing is passed through a line 308 under the influence of a pump 323 while that portion not needed for refluxing is passed through a line 328 under the influence of a pump 324 for such disposal as desired. The flow of condensate through line 328 is controlled by a float controlled motor valve apparatus 325 in response to the liquid level of condensate in tower 321.

Tubes 306 and 307 lead respectively from the top and lower vapor spaces of the column to the upper and lower sides of a diaphragm in a differential pressure controller apparatus 309. This differential pressure controller apparatus 309 is similar to the differential pressure controller apparatus 42 of Fig. 1. Air enters controller apparatus 309 from a source, not shown, by way of a tube 311. The pressure of air from this tube 311 is regulated in response to the pressure differential across the column and such air of regulated pressure is transmitted to a reset reflux flow controller apparatus 313. This reset flow controller apparatus 313 is similar to the corresponding apparatus 26 of Figure 1. Air from a source, not shown, enters this reset apparatus 313 by way of a tube 315 and air of regulated pressure is passed through a tube 316 to the underside of a diaphragm in a diaphragm operated spring loaded throttle valve 318. A bleed tube 319 is provided for continuously bleeding the air from the underside of said diaphragm. A vent is provided in the side of the diaphragm housing for equalization of pressure with the atmosphere in case of leakage through the diaphragm. A pressure gage 317 is provided in line 312 for indication and/or recording of air pressure. An orifice 314 is provided in line 308 to cooperate with the flow controller 313 to indicate the rate f reflux flow in line 308.

The operation of this embodiment of my invention is (illustrated in Figure 4) satisfactory for many installations. It is in general to be preferred over the apparatus as illustrated in Figure 3 since the use of the reset flow controller 313 makes for somewhat smoother operation and finer control than can be obtained without its use. In general, the apparatus of Figure 4 operates in a manner similar to that as illustrated in Figure 1 in that when a pressure differential increase is registered on the diaphragm of the differential controller 309 air pressure in tube 312 is increased and this increase in pressure causes a resetting of the reset element of the reset flow controller 313 which then operates to increase air pressure in tube 316. An increase of air pressure in tube 316 at least partially closes or throttles the valve of assembly 318 to restrict the flow of reflux through the reflux line 308. Similarly, when the pressure differential across the column decreases from any reason whatever, air pressure in tube 312 is decreased which decreases results in a resetting of the reset element of apparatus 313. This resetting then operates to reduce the air pressure in tube 316 thereby allowing the compression spring of the spring loaded diaphragm valve 318 to open the valve and permit increased flow and reflux.

While the motor valves 25, 116, 223, and 318 are illustrated and described as being spring loaded normally open diaphragm operated throttle valves they can be electrically operated throttle valves. When these valves are electrically operated throttle valves the reset apparatus 313 then controls electric current to reversible motors in the corresponding valve assemblies to permit rotation of the armature of the motor in one direction to partly close the valve and to reverse the current to permit rotation of the armature of the motor in the opposite direction to open the valve. Such electrically operated motor valves and such reset flow controllers operating in response to air pressure and controlling electric current are obtainable from instrument supply houses as standard equipment.

The maximum pressure differential at which a given distillation column is operated is, for example 10 pounds per square inch, with a reflux temperature of 100° F. and a reflux rate of one million gallons per day. When the reflux temperature drops to, for example, 90° F., as a result of a temperature drop in the cooling tower water during a winter cold wave, the pressure drop through the column will increase due to increased condensation on the top trays. The pressure transmitter assemblies transmit the changed pressures to the diaphragm of the differential pressure controller, which in turn resets the reset reflux flow controller to throttle the motor valve in the reflux line and reduce the flow of reflux until the pressure differential across the column is readjusted to its original value.

When reflux temperature rises, the pressure differential across the column decreases and the controls operate to increase the reflux rate to the column to reestablish the original desired pressure differential across the column.

As mentioned hereinbefore, when operating a fractinator at the maximum rate of flow of reflux, and it is known that the greater the rate of flow of reflux to a fractionating column, provided the column will not flood, the better the separation of the components within the tower.

The apparatus and method of my invention is applicable to the fractional distillation of substantially any type of feed stock which is capable of being separated by fractional distillation in conventional fractionators. Crude oils, multicomponent crude oil fractions, effluent products of cracking and other intermediate processing can be fractionated according to the herein disclosed process. Other materials, as mixtures of such chemicals as effluents of Fischer-Tropsch synthesis, separation of alcohols, or substantially any materials separable by conventional fractionation can be fractioned according to my invention.

While I have described one type of pressure transmitter assembly and one type of differential pressure controller, I do not wish to be limited thereby since other types of pressure transmitters and differential pressure controllers which are satisfactorily adaptable to carrying the broad concept of controlling addition of reflux to a fractionation column in response to a pressure differential at separate points of a fractional distillation column can be used. For example, apparatus can be used in place of the pressure transmitters which vary electrical current in response to changes in pressure at the bottom and top of the column. Two electrical currents of unlike voltages can be impressed on an instrument which puts out a current the voltage of which is proportional to the difference in input voltages. This latter instrument can then operate a reset flow controller for operating an electrically operated throttle valve in the reflux line.

Many valves, pressure and temperature indicating and control equipment, flow indicating and control equipment are not illustrated in the drawing nor described in the disclosure for purposes of simplicity since the installation and operation of such equipment, and its need, are well understood by those skilled in the art.

While certain embodiments of the invention have been described for illustrative purposes, the invention obviously is not limited thereto.

I claim:

1. A method for fractionally distilling a distillable mixture in a fractional distillation zone comprising introducing said mixture into said distillation zone at a point intermedate the ends, adding reboiling heat to the kettle section of said zone, removing liquid from said kettle section as one product of the process, removing vapors from the top of said zone, condensing at least a portion of said vapors, introducing at least a portion of the condensate as reflux into the upper portion of said zone at a maximum rate short of flooding as determined by a first pressure differential on opposite sides of at least one tray of said distillation zone, measuring a change in the pressure differential across said tray, regulating the rate of introduction of said reflux into said zone at a new maximum rate short of flooding in response to said change in pressure differential, and removing the remaining condensate as a second product of the process.

2. The method of claim 1 wherein when said change in pressure differential is an increase in pressure differential, the rate of introduction of said reflux to said zone is decreased in response thereto and when said change in pressure differential is a decrease in pressure differential, the rate of introduction of said reflux to said zone is increased in response thereto.

References Cited in the file of this patent

UNITED STATES PATENTS

| | | |
|---|---|---|
| 1,078,480 | Alston | Nov. 11, 1913 |
| 1,940,802 | Kallam | Dec. 26, 1933 |
| 2,022,809 | Kramer | Dec. 3, 1935 |
| 2,109,201 | Ragatz | Feb. 22, 1938 |
| 2,202,218 | Mallory | May 28, 1940 |
| 2,246,934 | Denney | June 24, 1941 |
| 2,455,243 | Epprecht | Nov. 30, 1948 |
| 2,643,216 | Findlay | June 23, 1953 |
| 2,709,778 | Berger | May 31, 1955 |

FOREIGN PATENTS

| | | |
|---|---|---|
| 650,378 | Germany | Sept. 21, 1937 |
| 887,565 | France | Nov. 17, 1943 |

OTHER REFERENCES

Wilson: "Fractionating Column Instrumentation," Oil and Gas Journal, Dec. 2, 1948, part 1, pps. 63, 64, 69, 71, 75. Dec. 9, 1948, part 2, pps. 75, 76, 79, 81, 82.

Ampt: "Del Regolatore 'Area,' Automatico Di Precisione," Applicable a Tutti 1 Campi di Lavoro e Delle Industrie. Via Emilio Praga N. 10, Milan, Italy.

"Unit Operations," by Brown & Assoc. (Willey & Sons), 1950, pp. 348–349.

"Laboratory Fractional—Distillation," by Carney (Macmillan Co., 1949).